Aug. 12, 1924.
F. B. THOMAS
1,504,397
SAFETY CAR CONTROL DEVICE
Filed Sept. 22, 1923
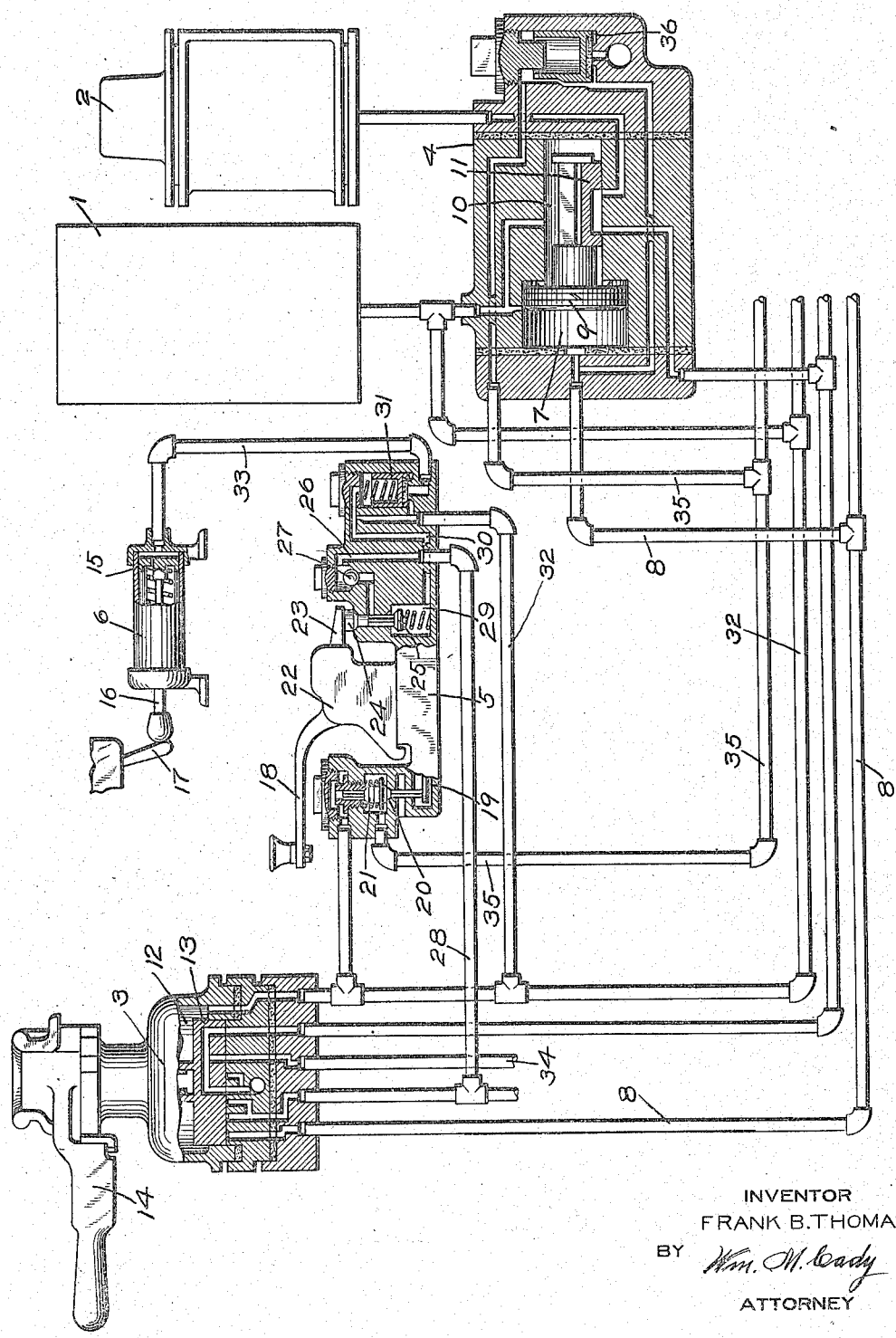
INVENTOR
FRANK B. THOMAS
BY Wm. M. Cady
ATTORNEY Patented Aug. 12, 1924.

1,504,397

UNITED STATES PATENT OFFICE.

FRANK B. THOMAS, OF WILKINSBURG, PENNSYLVANIA, ASSIGNOR TO THE WESTING-HOUSE AIR BRAKE COMPANY, OF WILMERDING, PENNSYLVANIA, A CORPORATION OF PENNSYLVANIA.

SAFETY CAR-CONTROL DEVICE.

Application filed September 22, 1923. Serial No. 664,231.

*To all whom it may concern:*

Be it known that I, FRANK B. THOMAS, a citizen of the United States, residing at Wilkinsburg, in the county of Allegheny and State of Pennsylvania, have invented new and useful Improvements in Safety Car-Control Devices, of which the following is a specification.

This invention relates to car control apparatus, and more particularly to the so-called one man or safety car control equipment.

With a safety car equipment, means are provided such that if the motorman releases the controller handle the brakes will be applied and the power circuit interrupted.

It is sometimes necessary for the operator to leave the car to replace the trolley wheel on the trolley wire and in order to prevent operation of the safety apparatus to apply the brakes and shut off the power in such case, it has heretofore been proposed to provide means such that if the motorman first makes an application of the brakes, the safety operation above referred to will not be effected when the operator releases the controller handle to leave the car.

The motorman may, however, neglect to move the controller handle to off position before he leaves the car and consequently when he replaces the trolley wheel on the trolley wire, current will be supplied to the car motors, the controller having been left in an "on" position. The result is that the power of the motors may be sufficient to overcome the holding power of the brakes and this may result in the car running away.

Safety control cars are also equipped with means for controlling the car doors and since it is necessary to open a car door in order that the motorman may leave the car to replace the trolley wheel, one object of my invention contemplates interlocking the function of opening the car door with means for opening the power circuit, so that if the operator should leave the car with the controller handle in an "on" position, the opening of the car door will automatically effect the opening of the power circuit, so that the car motors will not receive current when the trolley is replaced.

In the accompanying drawing, the single figure is a diagrammatic view, partly in section, of a safety car control equipment with my improvement applied thereto.

As shown in the drawing, the equipment may comprise a main reservoir 1, a brake cylinder 2, a brake valve device 3, an emergency valve device 4, a safety controller handle device 5, and a power circuit controlling device 6.

The emergency valve device 4 may comprise a casing having a piston chamber 7 connected to the emergency brake pipe 8 and containing piston 9 and having a valve chamber 10 connected to the main reservoir 1 and containing a slide valve 11 adapted to be operated by piston 9.

The brake valve device 3 may comprise a casing having a valve chamber 12 containing a rotary valve 13 adapted to be operated by handle 14.

The power circuit controlling device 6 may comprise a cylinder containing a piston 15 having a piston stem 16 which is adapted to engage the handle 17 of a power circuit breaker of the usual construction.

The safety controller handle device 5 may comprise a controller handle 18 adapted through the operation of lever 19 to permit the valve 20 to close and valve 21 to open when the handle is depressed and to close valve 21 and open valve 20 when the handle is released.

According to my invention, the controller handle head 22 which rotates with the controller handle 18 is provided with a flange 23 adapted to engage a valve 24 and hold same seated and at the same time, the seating of valve 24 operates to open a valve 25. The flange 23 engages the valve 24 in all "on" positions of the controller handle, but in the "off" position, the flange does not engage the valve, thus permitting the valve 24 to open and the valve 25 to close in the "off" position.

Communicating with the space between the valves 24 and 25 is a passage 26, containing check valve 27, and connected to the door closing pipe 28. Valve chamber 29, containing valve 25 is connected by passage 30 to the spring side of a valve piston 31, said valve piston being adapted to control communication from the main reservoir pipe 32 to pipe 33 which leads to the power circuit controlling cylinder 6.

It will be understood that in the usual manner, the car doors may be controlled by movement of the brake valve handle 14 and when the car doors are closed, fluid is supplied to the door closing pipe 28 and is released from the door opening pipe 34. The pipes being connected to the usual door engine (not shown), said engine operates to hold the doors closed. To open the car doors, the brake valve handle is operated so as to supply fluid to the door opening pipe 34 and vent fluid from the door closing pipe 28, so that the door engine is operated to open the car doors.

In the operation of my improvement, if the controller handle 18 is in any of its power on positions, the flange 23 will operate to hold the valve 24 seated and the valve 25 open, so that communication is established from the door closing pipe 28 to the spring side of valve piston 31. If the operator should wish to leave the car, as for the purpose of replacing the trolley wheel on the trolley wire, he will have to manipulate the brake valve handle 14 so as to open the car door. In this operation fluid is supplied to the door opening pipe 34 and released from the door closing pipe 28, and since the door closing pipe 28 is connected to the spring side of the valve piston 31, the reduction in pressure thus produced on the spring side of the valve piston, causes main reservoir pressure, which acts on the opposite seated area of the valve piston, to lift said valve piston, so that communication is established from the main reservoir pipe 32 to pipe 33.

Fluid under pressure is thus supplied to the piston 15 of the power circuit controller and the piston stem 16 is operated to throw the circuit breaker 17 to open position, so that the power circuit of the car motors is opened.

It will now be evident that when the operator replaces the trolley wheel, current will not be supplied to the car motors, even if the controller handle has been left in an "on" position.

If the controller handle is in its "off" position, the flange 23 does not engage the valve 24, so that the valve 25 will be permitted to move to its closed position, cutting off communication from the door closing pipe 28 to the valve piston 31. Therefore, in "off" position, the valve piston 31 will not operate to effect the opening of the power circuit. The controller handle being in "off" position, it is not necessary to open the power circuit, since the current is cut off at the controller.

It will be understood that the release of the controller handle 18 operates in the usual manner to close valve 21 and open valve 20. The opening of pilot valve 20 connects the safety control pipe 35 with the atmosphere and consequently fluid is vented from the top of the usual relay valve 36. Said valve is then operated to vent fluid from the emergency brake pipe 8 and piston chamber 7 of the emergency valve device 4. The reduction in pressure in piston chamber 7 causes movement of piston 9 and valve 11 to emergency position, in which fluid is supplied to the brake cylinder 2 to effect an emergency application of the brakes.

Having now described my invention, what I claim as new and desire to secure by Letters Patent, is:—

1. The combination with means for controlling the power circuit of the car motors, of means for controlling the car doors and means operated upon operation of said car door controlling means to open the car doors for effecting the operation of said power circuit controlling means to open the power circuit.

2. The combination with a controller handle and means for controlling the power circuit of the car motors, of means for controlling the car doors, and means operated upon operation of said car door controlling means to open the car doors for effecting the operation of said power circuit controlling means to open the power circuit, said power circuit controlling means being operative only in an "on" position of the controller handle.

3. The combination with a controller handle and means for controlling the power circuit of the car motors, of means for controlling the car doors, and means operated upon operation of said car door controlling means to open the car doors for effecting the operation of said power circuit controlling means to open the power circuit, said power circuit controlling means being operative in an "on" position of the controller handle and inoperative in the "off" position of said handle.

4. In a safety car control equipment, the combination with a controller handle, of means for controlling the car doors and means operated in an "on" position of the controller handle upon operation of the car door controlling means to open the car doors for effecting the opening of the power circuit to the car motors.

5. In a safety car control equipment, the combination with a controller handle, of valve means operated by a reduction in fluid pressure for effecting the opening of the power circuit to the car motors, and a pipe from which fluid is vented in opening the car doors, said pipe being connected to said valve means whereby upon opening the car doors said valve means is operated to effect the opening of the power circuit.

6. In a safety car control equipment, the combination with a controller handle, of valve means operated by a reduction in fluid pressure for effecting the opening of the power circuit to the car motors, a pipe from which fluid is vented in opening the car doors, and means operated by the movement of the controller handle for connecting said pipe to said valve means.

7. In a safety car control equipment, the combination with a controller handle, of valve means operated by a reduction in fluid pressure for effecting the opening of the power circuit to the car motors, a pipe from which fluid is vented in opening the car doors, and means operated by the movement of the controller handle to an "on" position for connecting said pipe to said valve means.

8. In a safety car control equipment, the combination with a controller handle, of a power circuit controlling cylinder and piston, valve means operable upon a reduction in fluid pressure for supplying fluid to said piston, a pipe from which fluid is vented in opening the car doors, and a valve controlled by the movement of the controller handle for controlling communication from said pipe to said valve means.

In testimony whereof I have hereunto set my hand.

FRANK B. THOMAS.